3,706,757
CERTAIN ORGANOTIN DERIVATIVES OF
3-HYDROXYISOTHIAZOLE
Sheldon N. Lewis, Willow Grove, and George Allen
Miller, Glenside, Pa., assignors to Rohm and Haas
Company, Philadelphia, Pa.
No Drawing. Continuation-in-part of application Ser. No.
647,586, June 21, 1967. This application July 22, 1970,
Ser. No. 57,367
Int. Cl. C07d 91/10, 91/12
U.S. Cl. 260—299
2 Claims

ABSTRACT OF THE DISCLOSURE

Disclosed herein is a novel group of compounds which are properly designated as 3-isothiazole derivatives being obtained, for the most part, by reacting a substituted 3-hydroxyisothiazole with an active halogen compound. These compounds and compositions thereof exhibit biocidal characteristics and are exceptionally effective in the control of living organisms.

CROSS-REFERENCE TO RELATED APPLICATION

This application is a continuation-in-part in the nature of a divisional application to copending United States Serial No. 647,586, filed on June 21, 1967, now U.S. Pat. No. 3,544,580.

This invention relates to a novel class of compounds exhibiting valuable biocidal characteristics. More particularly, this invention relates to novel isothiazole derivatives. Furthermore, this invention relates to biocidal compositions thereof and the utilization of such derivatives and compositions in the control of living organisms.

Included within the designation isothiazole derivatives are those compounds represented by the following formula

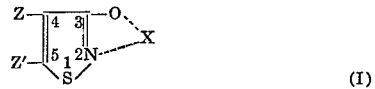
(I)

wherein
Z is hydrogen, lower alkyl, halogen or cyano;
Z' is lower alkylthio, aralkylthio of up to 8 carbon atoms, lower alkylsulfinyl, aralkylsulfinyl of up to 8 carbon atoms, lower alkylsulfonyl, or aralkylsulfonyl of up to 8 carbon atoms when Z is cyano;
Z' is hydrogen, lower alkyl, aralkyl of up to 8 carbon atoms, halogen or lower haloalkyl when Z is hydrogen, lower alkyl or halogen.

X in Formula I is selected from the group consisting of lower dialkyl phosphoryl; lower dialkyl thionophosphoryl; lower dialkyl dithiophosphoryl; lower dialkyl dithiothionophosphoryl; lower dialkoxyphosphino; lower dialkyldithiophosphino; lower trialkyltin; triphenyltin; alkylsulfenyl of 1 to 12 carbon atoms; halo-substituted lower alkylsulfenyl; lower alkylsulfonyl; phenylsulfonyl; lower alkyl- or halo-substituted phenylsulfonyl; the group represented by the formula

—CH=CH—R wherein R is CN, $CO_2H$, $CONH_2$, $CONHR^{II}$, $CON(R^{II})_2$, or

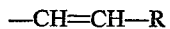

wherein $R^{II}$ is lower alkyl; the group represented by the formula

wherein $R^{III}$ is lower dialkylamino, lower alkylthio, lower alkoxy, phenoxy or thiophenoxy; the group represented by the formula

wherein $R^{IV}$ is alkyl of 1 to 12 carbon atoms, alkoxy of 1 to 6 carbon atoms, phenoxy, thiophenoxy, lower alkylthio, lower dialkylamino, an aryl group of the formula

wherein $R^V$ is lower alkyl, lower alkoxy, halogen or nitro and n is an integer from 0 to 3; or the difunctional group represented by the formula

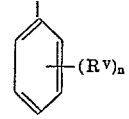

wherein Y is a methylene chain of 1 to 10 carbon atoms, phenylene or a lower alkyl- or halo-substituted phenylene.

In the above definition of the isothiazole derivatives, the expression "lower" is employed in conjunction with terms such as alkyl, alkoxy, alkylsulfinyl, alkylsulfonyl, haloalkyl, dialkyl, alkylthio, alkylsulfonyl, trialkyltin and the like. This recitation is intended to indicate that the alkyl or alkyl portion thereof has a carbon content of 1 to 4 carbon atoms. Typically, the alkyl or alkyl portion may be methyl, ethyl, n-propyl, isopropyl, butyl, t-butyl and the like.

Formula I generically describes the novel compounds of this invention; but as indicated therein, the defined X group can be attached to either of two positions, that is, on the nitrogen or oxygen. When the locus of the X group is on the oxygen, the compounds thereof are more specifically represented by the following formula

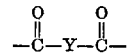

wherein the double bond is situated between the 2 and 3 positions. When the X group is attached to the nitrogen, the double bond is on the oxygen at the 3 position and thus, those compounds are best represented by the following formula

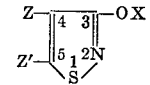
(III)

In both Formulas II and III, the Z and Z' substituents are as previously defined for Formula I.

Furthermore, as is evident, when X in Formula I is the group

then such compound is by necessity a bis-isothiazole structure.

These novel compounds, that is, the isothiazole derivatives represented by Formula I, and more specifically defined by Formulas II and III, are prepared by reacting 3-hydroxyisothiazole or a substituted 3-hydroxyisothiazole with an active halogen compound. By the recitation 3-hydroxyisothiazole is intended a compound of the formula

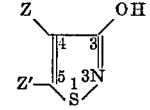
(IV)

wherein Z and Z' are defined as in Formula I.

The unsubstituted 3-hydroxyisothiazole, that is, where Z and Z' are hydrogen, is a compound well known in the art which can be synthesized from propiolamide by the method of W. D. Crow and N. J. Leonard, J. Org. Chem., 30, 2660–2665 (1965). Substituted 3-hydroxyisothiazoles are disclosed and can be prepared as shown in copending U.S. patent application Ser. No. 621,766 which is incorporated herein by reference thereto.

Active halogens such as are employed in this preparation may be depicted by the following formula $$XZ''' \qquad (V)$$

wherein X represents the same substituents set forth in Formula I. Z''' represents a halogen which is commonly, and preferably, chlorine. Of course, active bromides, fluorides and iodides are likewise utilized in this process.

When X represents the group $$-\overset{O}{\underset{\|}{C}}-Y-\overset{O}{\underset{\|}{C}}-$$

the active halogen defined as Formula V is in fact a diacid halide requiring two halogen atoms and more properly represented by the formula $$X(Z''')_2$$

Representative active halogens in accordance with Formula V include groups such as acyl and benzoyl halides, substituted benzoyl halides, alkyl haloformates, aryl haloformates, alkyl halothioformates, dialkyl carbamoyl and thiocarbamoyl halides, alkylsulfenyl halides and halosubstituted alkylsulfenyl halides, alkylsulfonyl halides, arylsulfonyl halides, alkyl β-haloacrylates, β-haloacrylamides, and β-haloacrylonitrile, dialkyl phosphoryl and thionophosphoryl halides, dialkyl dithiophosphoryl and dialkyl dithiothionophosphoryl halides, dialkyl dithiophosphoryl and dialkyl dithiothionophosphoryl halides, trialkyl and triaryltin halides and the like.

Some specific active halogens which are typical of those referred to herein include the following:

acetyl chloride
acetyl bromide
propionyl chloride
butyryl chloride
hexanoyl chloride
octanoyl chloride
decanoyl chloride
dodecanoyl bromide
malonyl chloride
adipyl chloride
sebacyl chloride
phthalyl chloride
benzoyl chloride
3-methylbenzoyl bromide
4-propylbenzoyl chloride
3,4-diethylbenzoyl chloride
3-chlorobenzoyl chloride
3,4-dichlorobenzoyl chloride
3,5-dibromobenzoyl chloride
4-nitrobenzoyl chloride
2,4-dinitrobenzoyl chloride
methyl chloroformate
propyl chloroformate
butyl bromoformate
hexyl chloroformate
ethyl chlorothioformate
phenyl chloroformate
phenyl chlorothioformate
dimethylcarbamoyl chloride
dipropylcarbamoyl bromide
dimethylthiocarbamoyl chloride
diethylthiocarbamoyl chloride
dibutylthiocarbamoyl bromide
methylsulfenyl chloride
propylfulfenyl chloride
butylsulfenyl chloride
hexylsulfenyl chloride
octylsulfenyl chloride
dodecylsulfenyl chloride
chloromethylsulfenyl chloride
dibromoethylsulfenyl chloride
trichloromethylsulfenyl chloride
methylsulfonyl chloride
phenylsulfonyl chloride
ethyl β-chloroacrylate
β-chloroacrylonitrile
N,N-dimethyl-β-chloroacrylamide
dimethyl phosphoryl bromide
diethyl phosphoryl chloride
dipropyl phosphoryl chloride
diethyl thionophosphoryl chloride
dibutyl thionophosphoryl bromide
diethyl dithiophosphoryl chloride
diethyl dithiothionophosphoryl chloride
diethyl chlorophosphite
diethyl chlorodithiophosphite
trimethyltin chloride
tripropyltin chloride
triphenyltin chloride Generally, this reaction is carried out in an inert organic solvent or combination of solvents such as benzene, toluene, xylene, ethyl acetate, ethylene dichloride and the like. Where one or both of the reactants is a liquid, it may not be necessary or advantageous to utilize any solvents in conjunction therewith, since a liquid medium would be so provided. In any event, the quantity and/or necessity of inert solvent in any particular reaction within the gamut of this invention would be evident to one skilled in the art.

Reaction temperature is not a critical factor in this process, that is, the reaction will usually proceed readily at any temperature over 0° C., and preferably, between 20° and 60° C. Where higher or lower temperatures are desired, they may be accommodated, and generally, their major effect will be in the speed with which the reaction takes place.

It is desirable and preferable to have a scavenger present during the reaction. Highly useful scavengers for a process such as disclosed herein include trialkylamines such as pyridine and triethylamine. Of course, the listed scavengers are merely exemplary, since many others which are likewise readily available can also be employed.

Preparation of these compounds by the process so disclosed involves an equimolar reaction, and therefore, equimolar amounts of the reactants are necessitated. However, an excess of the active halogen can be employed. This will generally insure a rapid completion of the reaction with improved yields.

It should be noted that during the preparation of the isothiazole derivatives there will be, on occasion, simultaneous production of both oxygen and nitrogen attached derivatives, that is, Formula II and III compounds. Such incidental concurrent production is contemplated and within the scope of this invention.

Isolation of the isothiazole derivatives is readily accomplished by any means evident to one skilled in the art. Generally, such separation will utilize a procedure such as distillation, crystallization, filtration and the like. Any of these means or combinations thereof can be readily employed not only in the separation of the reaction products from the reaction solution itself, but also in isolating Formula II and Formula III products from each other when both are obtained from the same reaction. It should be noted that for many applications and/or compositions, isolation of the isothiazole derivatives is not required. Thus, in those situations the reaction product containing the isothiazole derivatives may be employed without further purification or only so much as is necessitated for the use intended.

Any of the products falling within the scope of this invention are readily identified by means such as would be known to those skilled in the art. Typically, such means would include infra-red, ultraviolet and nuclear magnetic resonance spectroscopy along with chemical elemental analysis and the like.

As indicated, the compounds represented by Formula I are prepared by reacting a defined active halogen with 3-hydroxyisothiazole or a substituted 3-hydroxyisothiazole (Formula IV). In addition, the compounds of Formula I where X represents the group

—CH=CH—R can also be prepared by reacting 3-hydroxyisothiazole or a substituted 3-hydroxyisothiazole with an acetylenic compound of the formula

CH≡C—R          (VI)

wherein R is as defined in Formula I. Representative Formula VI acetylenic compounds include propiolnitrile, N,N-dimethylpropiolamide, N-methylpropiolamide, N,N-diethylpropiolamide, propiolic acid, methyl propiolate, ethyl propiolate, propyl propiolate, butyl propiolate, t-butyl propiolate and the like.

This latter reaction is commonly and preferably carried out in the presence of a basic catalyst, such as for example a quaternary ammonium hydroxide or a trialkylamine such as triethylamine or pyridine. All of the reaction conditions previously recited for the process which comprises reacting a 3-hydroxyisothiazole with an active halogen likewise apply to the process in question, that is, reacting a Formula VI compound with a 3-hydroxyisothiazole. By reaction conditions is meant, temperature, presence of solvents, method of separation, identification and the like. It should be noted that this process likewise involves an equimolar reaction. However, the presence of an excess of the acetylenic component may be employed.

The many facets of this invention are further illustrated by the following examples which are not to be construed as limitations thereof. On the contrary, resort may be had to various other embodiments, modifications and equivalents of these examples which readily suggest themselves to those skilled in the art without departing from the spirit of the present invention.

Examples 1 through 21 constitute illustrative compounds which were prepared by the procedure described herein. Table I lists these compounds and indicates thereon their structural formula and chemical name. Table II presents the elemental analysis and such physical data as melting point (M.P.) and boiling point (B.P.) for the compounds described in Table I. By way of further illustration, specific preparations for Examples 1, 2, 6, 7, 8, 9, 12, 13, 14, 15, 16 and 17 are set forth immediately hereinafter.

Examples 1 and 2.—Preparation of 2-butyryl-3-isothiazolone and 3-isothiazolyl butyrate To a solution containing 5 g. (0.05 mole) of 3-hydroxyisothiazole, 3.95 g. (0.05 mole) of pyridine, and 150 ml. of dry toluene at 0° C., there was added dropwise over 1 hour 5.3 g. (0.05 mole) of butyryl chloride. A precipitate of pyridine hydrochloride soon formed, and the slurry was stirred at room temperature for 12 hours to complete the reaction. The reaction was then filtered and the filtrate was evaporated to yield 12.5 g. of light yellow oil. The oil was treated with 100 ml. of pentane and cooled to give after filtration 3.4 g. (40 percent) of white solid 2-butyryl-3-isothiazolone, M.P. 57–60° C. Evaporation of the pentane gave a crude product which was distilled at 52–4° C./0.15 mm. to give 2.1 g. of pure 3-isothiazolyl butyrate.

Examples 6 and 7.—Preparation of 3-isothiazolyl 4'-nitrobenzoate and 2 - (4' - nitrobenzoyl) - 3 - isothiazolone To a solution of 5 g. (0.05 mole) of 3-hydroxyisothiazole, 3.95 g. (0.05 mole) of pyridine, and 125 ml. of toluene at 0° C., there was added dropwise over 1 hour a solution of 9.3 g. (0.05 mole) of 4-nitrobenzoyl chloride in 25 ml. of toluene. After completion of the reaction the slurry was filtered to yield a solid mixture of pyridine hydrochloride and the two products, 2-(4'-nitrobenzoyl)-3-isothiazolone and 3-isothiazolyl 4'-nitrobenzoate which after washing with water and drying gave 6.2 g. of the product mixture. This material was slurried in toluene and filtered to give 1.6 g. of pure 2-(4'-nitrobenzoyl)-3-isothiazolone, M.P. 134–8° C. The toluene filtrates from above were combined and evaporated to give 10.4 g. of pure 3-isothiazolyl 4'-nitrobenzoate, M.P. 123.5° C.

Examples 8 and 9.—Preparation of 3-isothiazolyl ethyl carbonate and 2-carbethoxy-3-isothiazolone To a solution containing 5.0 g. (0.05 mole) of 3-hydroxyisothiazole, 3.95 g. (0.05 mole) of pyridine and 150 ml. of toluene at 0° C., there was added dropwise over one hour 5.4 g. (0.05 mole) of ethyl chloroformate. After completion of the reaction the mixture was filtered to remove pyridine hydrochloride and the toluene filtrate was evaporated to leave 7.5 g. of yellow oil. This material was slurried in cold pentane to yield after filtration 2.2 g. of 2-carbethoxy-3-isothiazolone, M.P. 125–28° C. from benzene-hexane. The pentane solution was evaporated to give 5.3 g. of 3-isothiazolyl ethyl carbonate, B.P. 68–9°/0.3 mm.

Example 12.—Preparation of 3-isothiazolyl N,N-dimethylcarbamate

A solution of 6.9 g. (0.068 mole) of 3-hydroxyisothiazole, 5.4 g. (0.068 mole) of pyridine, and 250 ml. of benzene at 5° C. was treated dropwise over one hour with 7.3 g. (0.068 mole) of dimethylcarbamoyl chloride. After completion of the reaction the benzene solution was separated from the pyridine hydrochloride and evaporated to give 7.1 g. of 3-isothiazolyl N,N-dimethylcarbamate, B.P. 102° C./1.2 mm.

Example 13.—Preparation of 2-trichloromethylsulfenyl-3-isothiazolone

To a solution containing 5.0 g. (0.05 mole) of 3-hydroxyisothiazole, 3.95 g. (0.05 mole) of pyridine and 120 ml. of toluene at 0° C., there was added dropwise over one hour 9.4 g. (0.05 mole) of trichloromethyl sulfenyl chloride in 25 ml. of toluene. A precipitate formed at once, and after three hours stirring at room temperature, the reaction was complete. The mixture was filtered to give a solid, which after washing with water and drying gave 3.6 g. of 2-trichloromethylsulfenyl-3-isothiazolone, M.P. 113–116° C.

Example 14.—Preparation of 3-isothiazolyl diethyl phosphate and 2-diethylphosphoryl-3-isothiazolone To a toluene (150 ml.) solution containing 5.3 g. (0.0525 mole) of 3-hydroxyisothiazole and 4.15 g. (0.0525 mole) of pyridine, there was added dropwise at 0° C. 9.05 g. (0.0525 mole) of diethylchlorophosphate. After completion of the reaction the pyridine hydrochloride was removed by filtration and the toluene filtrate was evaporated. The crude product thus obtained was vacuum distilled to yield 8.2 g. of oil, B.P. 99–102° C./0.1 mm., which was shown by nuclear magnetic resonance analysis to be an 85/15 mixture of 3-isothiazolyl diethyl phosphate and 2-diethylphosphoryl-3-isothiazolone.

Example 15.—Preparation of (3-isothiazoloxy)-triphenylstannane

One gram (0.01 mole) of 3-hydroxyisothiazole and 1.0 g. (0.01 mole) of triethylamine were dissolved in 50 ml. of anhydrous ether and treated dropwise at room temperature with 3.85 g. (0.1 mole) of triphenylchlorostannane in 50 ml. of ether. After completion of the reaction, the slurry was filtered to yield 4.9 g. of white solid. This material was slurried in water to remove triethylamine hydrochloride, filtered and dried to give 3.7 g. of white solid (3-isothiazoloxy)-triphenylstannane, M.P. 188–190° C.

Example 16.—Preparation of methyl β-(3-isothiazoloxy)-acrylate

An ethyl acetate (125 ml.) solution of 5.0 g. (0.05 mole) of 3-hydroxyisothiazole and a catalytic amount of benzyltrimethylammonium hydroxide, was treated at 0° C. with 4.2 g. (0.05 mole) of methyl propiolate. After stirring at 25° C. for 16 hours, the reaction was filtered from a small amount of insoluble tar and then evaporated. The residue was crystallized from hexane to give 4 g. of solid methyl β-(3-isothiazoloxy)-acrylate, M.P. 63–5° C.

Example 17.—Preparation of 3-isothiazolyl diethyl phosphite

To a toluene (250 ml.) solution of 10.6 g. (0.105 mole) of 3-hydroxyisothiazole and 8.3 g. (0.105 mole) of pyridine, there was added dropwise at 0° C. 16.4 g. (0.105 mole) of diethyl chlorophosphite. After completion of the reaction, the slurry was filtered to remove pyridine hydrochloride, and the toluene filtrate was evaporated. The oil thus obtained was distilled to yield 10.5 g. of 3-isothiazolyl diethyl phosphite, B.P. 68–70° C. (0.1 mm.).

TABLE I.—ISOTHIAZOLE DERIVATIVE EXAMPLES

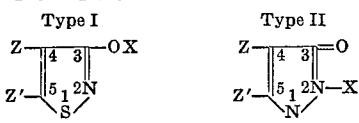

| Example No. | Type | Z | Z' | X | Name |
|---|---|---|---|---|---|
| 1 | II | H | H | —C(=O)—C$_3$H$_7$ | 2-butyryl-3-isothiazolone. |
| 2 | I | H | H | —C(=O)C$_3$H$_7$ | 3-isothiazolyl butyrate. |
| 3 | I and II | H | H | —C(=O)—CH$_3$ | 3-isothiazolyl acetate 2-acetyl-3-isothiazolone. |
| 4 | I | H | H | —C(=O)—C$_6$H$_4$—Cl(3) | 3-isothiazolyl 3'-chlorobenzoate. |
| 5 | I | H | H | —C(=O)—C$_6$H$_3$—Cl$_2$(3,4) | 3-isothiazolyl 3',4'-dichlorobenzoate. |
| 6 | I | H | H | —C(=O)—C$_6$H$_4$—NO$_2$(4) | 3-isothiazolyl 4'-nitrobenzoate. |
| 7 | II | H | H | —C(=O)—C$_6$H$_4$—NO$_2$(4) | 2-(4'-nitrobenzoyl)-3-isothiazolone. |
| 8 | I | H | H | —C(=O)—OC$_2$H$_5$ | 3-isothiazolyl ethyl carbonate. |
| 9 | II | H | H | —C(=O)—OC$_2$H$_5$ | 2-carbethoxy-3-isothiazolone. |
| 10 | I | H | CH$_3$ | —C(=O)—N(CH$_3$)$_2$ | 5-methyl-3-isothiazolyl N,N-dimethylcarbamate. |
| 11 | I | H | H | —C(=O)—N(CH$_3$)$_2$ | 3-isothiazolyl N,N-dimethylthiocarbamate. |
| 12 | I | H | H | —C(=O)—N(CH$_3$)$_2$ | 3-isothiazolyl N,N-dimethylcarbamate. |
| 13 | II | H | H | —SCCl$_3$ | 2-trichloromethylsulfenyl-3-isothiazolone. |
| 14 | I and II | H | H | —P(=O)—(OC$_2$H$_5$)$_2$ | 3-isothiazolyl diethyl phosphate 2-diethylphosphoryl-3-isothiazolone. |
| 15 | I | H | H | —Sn(C$_6$H$_5$)$_3$ | (3-isothiazoloxy)-triphenylstannane. |
| 16 | I | H | H | —CH=CHCO$_2$CH$_3$ | Methyl β-(3-isothiazoloxy)-acrylate. |
| 17 | I | H | H | —P—(OC$_2$H$_5$)$_2$ | 3-isothiazolyl diethyl phosphite. |
| 18 | I | H | H | —P(=S)—(OC$_2$H$_5$)$_2$ | 3-isothiazolyl diethyl thionophosphate. |
| 19 | I | CN | CH$_3$S | —P(=O)—(OC$_2$H$_5$)$_2$ | 4-cyano-5-methylthio-3-isothiazolyl diethyl phosphate. |
| 20 | I | Cl | Cl | —P(=O)—(OC$_2$H$_5$)$_2$ | 4,5-dichloro-3-isothiazolyl diethyl phosphate. |
| 21 | I and II | H | H | —C(=O)—(CH$_2$)$_8$—C(=O)— | Bis(3-isothiazolyl) sebacate sebacoyl bis [3-isothiazolone]. |

TABLE II

| Example No. | m.p./b.p. (° C.) | Analysis [1] | | | | | | | | | |
|---|---|---|---|---|---|---|---|---|---|---|---|
| | | C | | H | | N | | S | | P or Sn | |
| 1 | 57-60 | 49.15 | (49.1) | 5.23 | (5.29) | 7.92 | (8.38) | 18.66 | | (18.69) | |
| 2 | 52/.15 mm.[2] | 49.01 | (49.1) | 5.50 | (5.29) | 8.07 | (8.18) | 18.89 | | (18.69) | |
| 3 | Oil | 41.35 | (41.9) | 3.80 | (3.5) | 9.52 | (9.8) | | | | |
| 4 | 79-81 | 50.34 | (50.2) | 2.44 | (2.53) | 5.96 | (5.85) | 13.31 | | (13.4) | |
| 5 | 84-91 | 43.54 | (43.8) | 1.70 | (1.84) | 4.89 | (5.11) | 10.29 | | (11.7) | |
| 6 | 123-125 | 47.81 | (48.0) | 4.52 | (2.4) | 11.06 | (11.19) | 12.37 | | (14.79) | |
| 7 | 134-138 | 48.12 | (48.0) | 2.32 | (2.4) | 11.11 | (11.19) | 11.83 | | (12.37) | |
| 8 | 68-69/0.3 mm.[2] | 41.46 | (41.7) | 4.18 | (4.1) | 7.99 | (8.09) | 18.10 | | (18.49) | |
| 9 | 125-128 | 41.49 | (41.7) | 4.24 | (4.07) | 7.90 | (8.09) | 18.03 | | (18.49) | |
| 10 | 106/0.2 mm.[2] | 45.03 | (45.2) | 5.49 | (5.38) | 14.69 | (15.1) | 16.89 | | (17.2) | |
| 11 | 61-66 | 41.6 | (42.41) | 4.9 | (5.76) | 13.75 | (13.9) | 31.20 | | (31.6) | |
| 12 | 102:3.2 mm.[2] | 41.52 | (41.8) | 4.76 | (4.68) | 16.21 | (16.25) | 18.26 | | (18.55) | |
| 13 | 113-116 | 18.91 | (19.17) | 0.80 | (0.81) | 5.66 | (5.59) | 26.00 | | (25.60) | |
| 14 | 99-102/0.10 mm.[2] | 32.13 | (36.0) | 5.26 | (5.18) | 5.13 | (5.99) | 14.64 | | (13.74) [3] | 14.08 [3] (13.48) |
| 15 | 188-190 | 55.53 | (56.0) | 3.76 | (3.8) | 3.03 | (3.1) | 6.58 | | (7.1) [4] | 26.21 [4] (26.40) |
| 16 | 63-65 | 45.47 | (45.4) | 3.84 | (3.81) | 7.60 | (7.56) | 17.32 | | (17.29) | |
| 17 | 68-70/0.1 mm.[2] | 37.73 | (38.0) | 5.61 | (5.5) | 5.96 | (6.3) | 13.91 | | (14.5) [3] | 13.47 [3] (14.0) |
| 18 | 98-99/0.05 mm.[2] | 33.47 | (33.3) | 4.99 | (4.8) | 4.41 | (5.5) | 24.27 | | (15.3) [3] | 12.45 [3] (14.3) |
| 19 | Oil | 35.83 | (35.1) | 4.87 | (4.3) | 8.32 | (9.0) | 17.70 | | (10.7) [3] | 9.99 [3] (10.0) |
| 20 | Oil | 28.88 | (27.5) | 3.70 | (3.3) | 3.51 | (4.5) | 9.57 | | (10.4) [3] | 10.08 [3] (10.3) |
| 21 | 123-129 | 53.19 | (52.2) | 5.70 | (5.48) | 7.63 | (7.61) | 17.13 | | (17.38) | |

[1] The number parenthesized represents the theoretical value, as calculated, using the empirical formula of each compound.
[2] Boiling point.
[3] P. [4] Sn.

Example 22

Hereinafter set forth are additional isothiazole derivatives which serve to further illustrate this invention. These compounds are prepared by the process previously disclosed in a manner similar to that employed in Examples 1 to 21.

3-isothiazolyl dipropyl phosphate
2-dibutylphosphonyl-3-isothiazolone
3-isothiazolyl dimethyl thionophosphate
5-methyl-3-isothiazyl dipropyl thionophosphate
3-isothiazolyl S,S'-dibutyl dithiophosphate
2-dibutyldithiophosphoryl-3-isothiazolone
4,5-dichloro-2-dibutyldithiophosphoryl-3-isothiazolone
3-isothiazolyl S,S'-diethyl dithiothionophosphate
4-bromo-2-dipropyldithiothionophosphoryl-3-isothiazolone
4-methyl-3-isothiazolyl dimethyl phosphite
5-chloro-3-isothiazolyl dipropyl phosphite
3-isothiazolyl S,S'-dipropyl dithiophosphite
2-dipropyldithiophosphino-3-isothiazolone
(3-isothiazoloxy)-tributylstannane
(3-isothiazoloxy) trimethylstannane
(4-cyano-5-methylthio-3-isothiazoloxy)tributylstannane
2-tributyltin-3-isothiazolone
2-triphenyltin-3-isothiazolone
5-bromo-2-triphenyltin-3-isothiazolone
4,5-dimethyl-2-triethyltin-3-isothiazolone
(5-benzyl-3-isothiazoloxy)triphenylstannane
(4,5-dimethyl-3-isothiazoloxy)-tripropylstannane
3-isothiazolyl n-butylsulfenate
2-n-dodecylsulfenyl-3-isothiazolone
5-bromomethyl-3-isothiazolyl n-hexylsulfenate
3-isothiazolyl trichloromethylsulfenate
3-isothiazolyl methylsulfonate
4-cyano-5-methylsulfinyl 3-isothiazolyl methylsulfonate
2-methylsulfonyl-3-isothiazolone
4-bromo-5-chloro-2-methylsulfonyl-3-isothiazolone
3-isothiazolyl benzenesulfonate
2-benzenesulfonyl-3-isothiazolone
3-isothiazolyl p-toluenesulfonate
4-cyano-5-methylthio-3-isothiazolyl p-chlorobenzenesulfonate
2-p-bromobenzenesulfonyl-3-isothiazolone
β-(3-isothiazoloxy)-acrylonitrile
2-(2'-cyanoethenyl)-3-isothiazolone
β-(3-isothiazoloxy)-acrylamide
2-(2'-carboxamidoethenyl)-3-isothiazolone
β-(3-isothiazoloxy)-N-methylacrylamide
β-(5-chloro-3-isothiazoloxy)-N-methylacrylamide
β-(3-isothiazoloxy)N,N-dimethylacrylamide
β-(3-isothiazoloxy)-acrylic acid
β-(4-methyl-5-chloro-3-isothiazoloxy)-acrylic acid
β-(5-chloro-3-isothiazoloxy) acrylonitrile
4,5-dimethyl-2-(2'-cyanoethenyl)-3-isothiazolone
5-propyl-2-(2'-carboxamidoethenyl)-3-isothiazolone
β-(4-cyano-5-benzylsulfonyl-3-isothiazoloxy)acrylic acid
β-(3-isothiazoloxy)-N-butylacrylamide
2-(2'-N-methylcarboxamidoethenyl)-3-isothiazolone
methyl β-(3-isothiazoloxy)acrylate
butyl β-(5-chloro-3-isothiazoloxy)acrylate
2-(2'-carbethoxyethenyl)-3-isothiazolone
N,N-dimethylthiocarbamoyl-3-isothiazolone
3-isothiazolyl S-ethyl thiothionocarbonate
2-dithiocarbethoxy-3-isothiazolone
4-cyano-5-benzylsulfonyl-3-isothiazolyl ethyl carbonate
4-butyl-5-chloro-3-isothiazolyl methyl carbonate
3-isothiazolyl propyl thionocarbonate
3-isothiazolyl phenyl thionocarbonate
4-methyl-3-isothiazolyl phenyl thionocarbonate
3-isothiazolyl S-phenyl thiothionocarbonate
3-isothiazolyl hexanoate
2-hexanoyl-3-isothiazolone
4-cyano-5-benzylthio-3-isothiazolyl octanoate
3-isothiazolyl phenylcarbonate
2-carbphenoxy-3-isothiazolone
3-isothiazolyl S-butyl thiocarbonate
2-thiocarbobutoxy-3-isothiazolone
3-isothiazolyl N,N-dibutylcarbamate
2-N,N-dibutylcarbamoyl-3-isothiazolone
bis(3-isothiazolyl) adipate
adipoyl bis [3-isothiazolone]
3-isothiazolyl terephthalate
2-terephthalyl-3-isothiazolone The isothiazole derivatives of this invention exhibit biocidal activity which renders them especially suitable for the control of living organisms and particularly microorganisms. For this reason, they are exceptionally effective as bactericidal, algaecidal, fungicidal and pesticidal agents. Furthermore, these novel compounds possess the unexpected property of being resistant to inhibition by common additives or contaminants, such as lecithin, normal horse serum, alkylbenzene sulfonates, water-soluble lanolin, sodium chromate, sodium nitrite, glycerol, propylene glycol and the like.

Fungicidal evaluation of the isothiazole derivatives was carried out by the standard slide spore germination test (cf. Phytopathology, 33, 627 (1943), utilizing spores of *Alternaria solani* (Alt.), *Sclerotinia fructicola* (Scl.) and *Stemphylium sarcinaeforme* (Stem.) or *Botrytis cinerea* (Bot.). Values so obtained are set forth in Table III and represent the concentration in parts per million (p.p.m.) which effectively controlled 50% of the spores ($ED_{50}$).

Antibacterial activity was evaluated by the Serial Dilution Test (Broth Titer Test) wherein a series of broths containing varying dilutions of a test compound and an organism are halved starting with 1:1,000. The values obtained, which are also shown in Table III, represent the maximum dilution at which the compound under observation renders complete control of the organism. *Staphylococcus aureus* (*S. aureus*) and *Escherichia coli* (*E. coli*) were the bacterial organisms employed in this test.

TABLE III.—MICROBIOLOGICAL ACTIVITY

| Example No. | Fungicidal evaluation | | | Bacteriostatic evaluation | |
|---|---|---|---|---|---|
| | Alt. | Scl. | Stem. (bot.) a | *S. aureus* | *E. coli* |
| 1 | <1 | <1 | a1-10 | 1:8,000 | 1:16,000 |
| 2 | | | | 1:8,000 | 1:8,000 |
| 3 | | | | 1:8,000 | 1:16,000 |
| 4 | 10-50 | 1-10 | 1-10 | 1:4,000 | 1:2,000 |
| 5 | 10-50 | 1-10 | 10-50 | 1:2,000 | 1:1,000 |
| 6 | 10-50 | <1 | 1-10 | 1:4,000 | 1:4,000 |
| 7 | 200-1,000 | 200-1,000 | >1,000 | 1:4,000 | 1:4,000 |
| 8 | | | | 1:8,000 | 1:32,000 |
| 9 | 10-50 | 50-200 | 50-200 | 1:1,000 | 1:1,000 |
| 10 | 200-1,000 | >1,000 | a>1,000 | | |
| 11 | | | | | |
| 12 | | | | 1:2,000 | 1:2,000 |
| 13 | 10-50 | 1-10 | 10-50 | 1:8,000 | 1:4,000 |
| 14 | 50-200 | 10-50 | 50-200 | 1:2,000 | 1:2,000 |
| 15 | <1 | <1 | <1 | 1:256,000 | 1:2,000 |
| 16 | 10-50 | 50-200 | 10-50 | 1:4,000 | 1:8,000 |
| 17 | | | | 1:4,000 | 1:4,000 |
| 18 | | | | 1:2,000 | 1:<1,000 |
| 19 | | | | | |
| 20 | | | | | |
| 21 | >1,000 | 200-1,000 | 50-200 | 1:8,000 | 1:4,000 |

Further fungicidal activity on the part of the isothiazole derivatives was demonstrated by their utilization in a seed treatment application. By seed treatment is meant the disseminating of a biocidally active material over a seed subject to the attack of microorganisms, and particularly fungi, in an amount which is effective to control such microorganisms. The isothiazole derivatives have exhibited characteristics which render them especially useful for seed treatment applications.

An experimental technique was employed to demonstrate the effectiveness of these compounds for such purposes. This involved slurrying two lots of 100 corn seeds each with the isothiazole derivative under evaluation at a level of 1 to 2 ounces per bushel of seed. For purposes of comparison, a well known commercially available fungicide, namely, zinc-activated maneb, was likewise included as a test compound. After drying, the seeds were planted in a muck soil having a high moisture content and being infested with Pythium. The plant seeds were maintained in this solid for a week at about 10° C. so as to permit infection. Upon completion of this period of time, the temperature was elevated and maintained at about 21° to 27° C. so as to permit germination of the non-infected seed. The number of seeds germinating were counted after emergence of the plant and such data is set forth in Table IV.

TABLE IV.—SEED TREATMENT

| Test compound: | No. of plants germinating/200 seeds |
|---|---|
| 3-isothiazolyl 4'-nitrobenzoate | 42 |
| 3-isothiazolyl 3',4'-dichlorobenzoate | 58 |
| 3-isothiazolyl 3'-chlorobenzoate | 73 |
| (3-isothiazoxy)-triphenylstannane | 126 |
| Zinc-activated maneb | 39 |

Examination of the isothiazole derivatives with respect to pesticidal activity demonstrated their exceptional control of numerous nematodes, mites, insects, such as beetles and aphids, and the like. Some typical nematodes, insects and mites which were controlled when contacted with the compounds of this invention included the following: Northern root knot nematode (*Meloidogyne hapla*), Mexican bean beetle (*Epilachna varivesta*), black carpet beetle (*Attagenus piceus*), confused flour beetle (*Tribolium confusum*), granary weevil (*Sitophilus granarius*), two spotted mite (*Tetranychus urticae*), house fly (*Musca domestica*), Southern armyworm (*Prodenia eridania*), German cockroach (*Blattella germanica*), and green peach aphid (*Myzus persicae*).

With regard specifically to insecticidal activity, compounds such as 3-isothiazolyl diethyl phosphate, 3-isothiazyl diethyl thionophosphate and 3-isothiazolyl diethyl phosphite were found to be particularly effective. Significantly, the isothiazole derivatives generally and especially these latter mentioned compounds have exhibited such activity by conventional contact means and likewise by the foliar systemic route. The recitation, "foliar systemic route" is intended to designate the ability of these isothiazole derivatives to demonstrate their insecticidal properties on the foliage of a plant which has absorbed the compound through its roots.

Generally, control of a living organism is achieved in accordance with this invention by contacting the organism with an isothiazole derivative in an amount which is effective to control said organism. Any of the techniques known in the art may be employed to disseminate the isothiazole derivatives in a manner such as to achieve the desired contact with the organism to be controlled. Spraying and fumigating are typical of such techniques. However, as mentioned above, in certain situations a foliar systemic process may be utilized in the deployment of these materials. Consequently, a water drench having the active compounds incorporated therein proves to be most effective.

The compounds and compositions of this invention are readily utilized as biocides and particularly as slimicides, algaecides, bactericides, fungicides or combinations thereof in any loci and particularly in aqueous media, such as for example, water-cooling systems, swimming pools, paper pulp processes, etc. In addition, these compounds and/or compositions may serve functions, such as for example, preservatives, especially fabric and leather preservatives, soap additives, sanitizing agents, and preservatives for metal working compounds and the like.

In general, a loci subject to attack by microorganisms may be protected in accordance with this invention by incorporating into said loci an isothiazole derivative in an amount which is effective to control said microorganisms. The exact amount of isothiazole derivative required will, of course, vary with the medium being protected, the microorganisms being controlled, the particular isothiazole derivatives or compositions thereof being employed and the like. Typically, in a liquid media, excellent control is obtained when the isothiazole derivatives are incorporated in the range of 0.1 to 10,000 parts per million (p.p.m.) or 0.00001 to 1% based on the weight of the medium. A range of 1 to 2000 p.p.m. is preferred.

The term "control," as employed in the specification and claims of this application is to be construed as any means which adversely affects the existence or growth of any living organism or microorganism. Such means may comprise a complete killing action, eradication, arresting in growth, inhibition, reduction in number or any combination thereof.

Outstanding fungistatic activity by the isothiazole derivatives was exhibited when they were employed as paint preservatives and paint fungistats. Microbial activity in acrylic based paint emulsions is effectively inhibited when these compounds are incorporated at the rate of about 2-20 pounds or more per 100 gallons of paint.

The isothiazole derivatives of this invention are especially useful as agricultural fungicides. As such, they are particularly valuable when formulated in a fungicidal composition. Such compositions normally comprise by weight 0.5 to 99.5% of an agronomically acceptable carrier and 99.5 to 0.5% of a compound or compounds disclosed herein as the active agent or agents. Where necessary or desirable, surfactants or other additives may be incorporated to give uniformly formulated mixtures.

By "agronomically acceptable carrier" is meant any substance which can be utilized to dissolve, dispense or diffuse the chemical incorporated therein without impairing the effectiveness of the toxic agent and which does no permanent damage to such environment as soil, equipment and agronomic crops.

For use as pesticides, the compounds of this invention are usually taken up in an agronomically acceptable carrier or formulated so as to render them suitable for subsequent disseminattion. For example, the isothiazole derivatives may be formulated as wettable powders, emulsion concentrates, dusts, granular formulations, aerosols or flowable emulsifiable concentrates. In such formulations, the isothiazole derivatives are extended with a liquid or solid carrier and, when desired, suitable surfactants are likewise incorporated.

Compounds of this invention may be dissolved in a water miscible liquid, such as ethanol, isopropanol, acetone, and the like. Such solutions are easily extended with water.

The isothiazole derivatives may be taken up, on, or mixed with a finely particled solid carrier, as for example, clays, inorganic silicates, carbonates and silicas. Organic carriers may also be employed. Dust concentrates are commonly formulated wherein the isothiazole derivatives are present in the range of 20 to 80%. For ultimate applications, these concentrates are normally extended with additional solid from about 1 to 20%.

Wettable powder formulations are made by incorporating the compounds of this invention in an inert, finely divided solid carrier along with a surfactant which may be one or more emulsifying, wetting, dispersing or spreading agents or blend of these. The isothiazole derivatives are usually present in the range of 10 to 80% by weight and the surfactants in from 0.5 to 10% by weight. Commonly used emulsifying and wetting agents include polyoxyethylated derivatives of alkylphenols, fatty alcohols, fatty acids and alkylamines; alkylarene sulfonates and dialkyl sulfosuccinates. Spreading agents include such materials as glycerols mannitan laurate and a condensate of polyglycerol and oleic acid modified with phthalic anhydride. Dispersing agents include such materials as the sodium salt of the copolymer of maleic anhydride and an olefin such as diisobutylene, sodium lignin sulfonate and sodium formaldehydenaphthalene sulfonates.

One convenient method for preparing a solid formulation is to impregnate the isothiazole derivative toxicant onto the solid carrier by means of a volatile solvent, such as acetone. In this manner, adjuvants, such as activators, adhesives, plant nutrients, synergists and various surfactants, may also be incorporated.

Emusifiable concentrate formulations may be prepared by dissolving the isothiazole derivatives of this invention in an agronomically acceptable organic solvent and adding a solvent soluble emulsifying agent. Suitable solvents are usually water immiscible and may be found in the hydrocarbon, chlorinated hydrocarbon, ketone, ester, alcohol, and amide classes of organic solvents. Mixtures of solvents are commonly employed. The surfactants useful as emulsifying agents may constitute about 0.5% to 10% by weight of the emulsifiable concentrate and may be anionic, cationic or non-ionic in character. Anionic surfactants include alcohol sulfates or sulfonates, alkylarene sulfonates and sulfosuccinates. Cationic surfactants include fatty acid alkylamine salts and fatty acid alkyl quaternaries. Non-ionic emulsifying agents include ethylene oxide adducts of alkylphenols, fatty alcohols, mercaptans and fatty acids. The concentration of the active ingredients may vary from 10 to 80%, preferably in the range of 25 to 50%.

For use as phytopathogenic agents, these compounds should be applied in an effective amount sufficient to exert the desired biocidal activity by techniques well known in the art. Usually, this will involve the application of the isothiazole derivatives to the loci to be protected in an effective amount when incorporated in an agronomically acceptable carrier. However, in certain situations it may be desirable and advantageous to apply the compounds directly onto the loci to be protected without the benefit of any substantial amount of carrier. This is a particularly effective method when the physical nature of the isothiazole derivatives is such as to permit what is known as "low-volume" application, that is, when the compounds are in liquid form or substantially soluble in higher boiling solvents.

The application rate will, of course, vary depending upon the purpose for such application, the isothiazole derivatives being utilized, the frequency of dissemination and the like.

For use as agricultural bactericides and fungicides, dilute sprays may be applied at concentrations of 0.05 to 20 pounds of the active isothiazole derivative ingredient per 100 gallons of spray. They are usually applied at 0.1 to 10 pounds per 100 gallons and preferably at 0.125 to 5 pounds per 100 gallons. In more concentrated sprays, the active ingredient is increased by a factor of 2 to 12. With dilute sprays, applications are usually made to the plants until run-off is achieved, whereas with more concentrated or low-volume sprays the materials are applied as mists.

The compounds of this invention may be utilized as the sole biocidal agents or they may be employed in conjunction with other fungicides, insecticides, miticides and comparable pesticides.

We claim:
1. A compound of the formula (a) or (b):

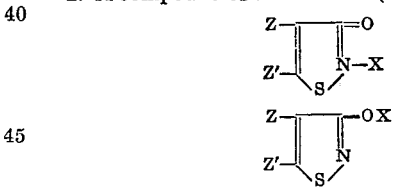

wherein
Z is hydrogen, lower alkyl, halogen, or cyano;
Z', when Z is cyano, is lower alkylthio, aralkylthio of up to 8 carbon atoms, lower alkylsulfinyl, aralkylsulfinyl of up to 8 carbon atoms, lower alkylsulfonyl, or aralkylsulfonyl of up to 8 carbon atoms;
Z', when Z is hydrogen, lower alkyl or halogen, is hydrogen, lower alkyl, aralkyl of up to 8 carbon atoms, halogen, or lower haloalkyl; and
X is lower trialkyltin, or triphenyltin.
2. A compound according to claim 1 wherein Z and Z' are hydrogen.

References Cited
UNITED STATES PATENTS
3,544,580  12/1970  Lewis et al. _____ 260—299

ALEX MAZEL, Primary Examiner

R. J. GALLAGHER, Assistant Examiner